(12) United States Patent
Shellshear (10) Patent No.: US 7,817,905 B2
(45) Date of Patent: Oct. 19, 2010

(54) VIDEO CAMERA AND REMOTE RECORDING SYSTEM

(75) Inventor: Andrew John Shellshear, Marrickville (AU)

(73) Assignee: Canon Kabushiki Kaisha, Tokyo (JP)

( * ) Notice: Subject to any disclaimer, the term of this patent is extended or adjusted under 35 U.S.C. 154(b) by 1047 days.

(21) Appl. No.: 11/251,836

(22) Filed: Oct. 18, 2005

(65) Prior Publication Data

US 2006/0104616 A1    May 18, 2006

(30) Foreign Application Priority Data

Nov. 17, 2004    (AU) ............................. 2004906592

(51) Int. Cl.
*H04N 5/00* (2006.01)
*H04N 5/91* (2006.01)

(52) U.S. Cl. ......................................... 386/117; 386/46

(58) Field of Classification Search ................. 386/46, 386/117
See application file for complete search history.

(56) References Cited

U.S. PATENT DOCUMENTS

| | | | | |
|---|---|---|---|---|
| 5,568,205 A | | 10/1996 | Hurwitz ....................... | 348/723 |
| 5,726,708 A | * | 3/1998 | Sakai et al. ............... | 348/231.4 |
| 5,874,947 A | | 2/1999 | Lin ............................ | 345/169 |
| 6,052,509 A | | 4/2000 | Abe ............................ | 386/117 |
| 2003/0011685 A1 | * | 1/2003 | Oka et al. ................. | 348/211.2 |
| 2003/0151663 A1 | | 8/2003 | Lorenzetti et al. | |
| 2004/0005918 A1 | * | 1/2004 | Walker et al. ............... | 463/16 |
| 2005/0259754 A1 | | 11/2005 | Ho et al. ................. | 375/240.28 |
| 2006/0023081 A1 | | 2/2006 | Sekiguchi et al. ......... | 348/231.3 |
| 2006/0104344 A1 | * | 5/2006 | Chen ...................... | 375/240.01 |

FOREIGN PATENT DOCUMENTS

| | | |
|---|---|---|
| GB | 2 416 948 | 2/2006 |
| JP | 4-240974 | 8/1992 |
| JP | 9-83854 | 3/1997 |
| JP | 2001-339631 | 12/2001 |
| WO | 2004/023688 A1 | 3/2004 |

OTHER PUBLICATIONS

Abridgement in Australian Patent Appln. No. 2005225086.

* cited by examiner

*Primary Examiner*—Marsha D Banks Harold
*Assistant Examiner*—Asher Khan
(74) *Attorney, Agent, or Firm*—Fitzpatrick, Cella, Harper & Scinto (57) ABSTRACT

A system for recording audio and video comprises at least one video camera device (100), each camera device comprising a subsystem for capturing (112) at least video data, a storage device (107) upon which at least the video data is stored, a wireless interface (108) for communicating with at least one further recording device (200), an internal clock(106) for recording at least a time at which the video data was recorded, and a connecting port (108, 110) enabling connection to a remote-control device (eg. 200). The system also has at least one of the further recording devices (200), each comprising a microphone (215) for capturing audio information and a storage device upon which corresponding audio data is recorded, a wireless interface (208) for communicating with the video camera device, an internal clock (206) for recording at least a time at which the audio data was recorded, and a connection port (208,210) enabling connection to the video camera device.

6 Claims, 7 Drawing Sheets

VIDEO CAMERA AND REMOTE RECORDING SYSTEM

FIELD OF INVENTION

The present invention relates to the recording of audio with a video camera and, in particular, to the usage and integration of a separated audio source.

BACKGROUND

Integrated microphones are found upon almost all video cameras in the marketplace and are used to record one or more audio tracks in synchronism with video images simultaneously recorded by the camera. Such integrated microphones generally result in poor recorded sound quality, often in spite of the quality of the microphone itself, but primarily because the microphone is not usually positioned close to enough to the sound producing subject. Typically such microphones are omnidirectional and detect much extraneous noise which is recorded along with the subject sound. Existing methods of getting the microphone closer to the desired sound source are unsatisfactory in various ways.

For example, running a cable from the camera to a separate microphone can be inconvenient, potentially dangerous, and is often impractical.

Wireless microphones may be used but are expensive and unreliable. If there is interference between the transmitter and receiver, audio information will often be lost or quality will be reduced. Further, where an increasing number of wireless microphones are used in an area, for example by a number of people making a video recording, it is more likely that there will be interference or lost data.

In professional film and video recording, sound is usually recorded completely separately from the video, and later recombined using such standards as the SMPTE time code system. However, the SMPTE time code system was created with the limitations of tape-based recording media in mind. The SMTPE system requires the recording of an additional audio track containing a special "sync tone", which contains a simple measure of time. The sync tone repeats every twenty-four hours, however, so it is possible for the system to become confused if recording occurs over a longer period of time. Also, synchronization can be awkward. Devices that wish to be synchronized have to record the sync tone when they do their own recording. If there are several devices recording, they must all connect to the same source producing the sync tone. When the data from separate devices are combined, synchronization is achieved by lining up the sync tones on each device. The inconvenience of recording the same sync tone on each device is too great for most amateur video recording artists.

Video camera remote-controls are typically used when the user of the camera is not nearby the camera. In the instance that the user operates the remote-control to turn the camera on and off, this is usually because the user is in front of the camera and hence is at least part of the subject being recorded.

SUMMARY OF THE INVENTION

It is an object of the present invention to substantially overcome or at least ameliorate one or more deficiencies with existing recording methods.

The present invention addresses this object to allow convenient recording using multiple audio and video sources that can be simply synchronized in a post-recording environment.

In accordance with one aspect of the present invention, there is disclosed a system for recording audio and video, said system comprising:

at least one video camera device, each said camera device comprising a subsystem for capturing at least video data, a storage device upon which at least said video data is stored, a wireless interface for communicating with at least one further recording device, an internal clock for recording at least a time at which said video data was recorded, and a connecting port enabling connection to a remote-control device; and at least one said further recording device, each said remote recording device comprising at least one microphone for capturing audio information, a storage device upon which corresponding audio data is recorded, a wireless interface for communicating with said video camera device, an internal clock for recording at least a time at which said audio data was recorded, and a connection port enabling connection to said video camera device.

Desirably one said remote recording device is adapted to be physically and detachably coupled to one said video camera device for at least audio recording operations at the video camera device and, when detached, for audio recording operations at a location remote from said video camera device.

In accordance with another aspect of the present invention there is disclosed a system for recording audio and video data, said system comprising:

a video camera device comprising a subsystem for capturing at least video data, a storage device upon which at least said video data is stored, a wireless interface for communicating with at least one remote controller, and an internal clock for recording at least a time at which said video data was recorded; and at least one said remote controller, each said remote controller comprising at least one microphone for capturing audio data, a storage device upon which said audio data is stored, a wireless interface for communicating with said video camera device, and an internal clock for recording at least a time at which said audio data was recorded, wherein said remote controller transmits reproduced audio data to said video camera device, and makes said video camera device record said reproduced audio data relating to said video data in accordance with each said internal clock of said remote controller and said video camera device.

In accordance with another aspect of the present invention there is disclosed a method for recording audio and video, said method comprising the steps of:

(a) physically connecting an audio device having an internal clock to a video device having a complementary internal clock, thereby synchronizing and associating the two devices;

(b) physically disconnecting the devices;

(c) instructing the audio device to record audio data that contains or is at least associated with a current time presented by the internal clock on the audio device, thereby causing the audio device to commence recording;

(d) instructing the video device to record video data that contains or is at least associated with a current time presented by the internal clock on the video device, thereby causing the video device to commence recording;

(e) instructing the audio device to stop recording;

(f) instructing the video device to stop recording; and (g) physically connecting the audio device to the video device, thereby causing audio data and associated or embedded time data stored on the audio device to be transferred to the video device.

Preferably the audio device in step (c) sends a wireless instruction to the video device to commence recording, said wireless instruction being received by said video device in step (d) to automatically trigger recording by said video device.

Many other aspects of the invention are also disclosed.

BRIEF DESCRIPTION OF THE DRAWINGS

At least one embodiment of the present invention will now be described with reference to the drawings, in which.

DETAILED DESCRIPTION INCLUDING BEST MODE

Figure 1:
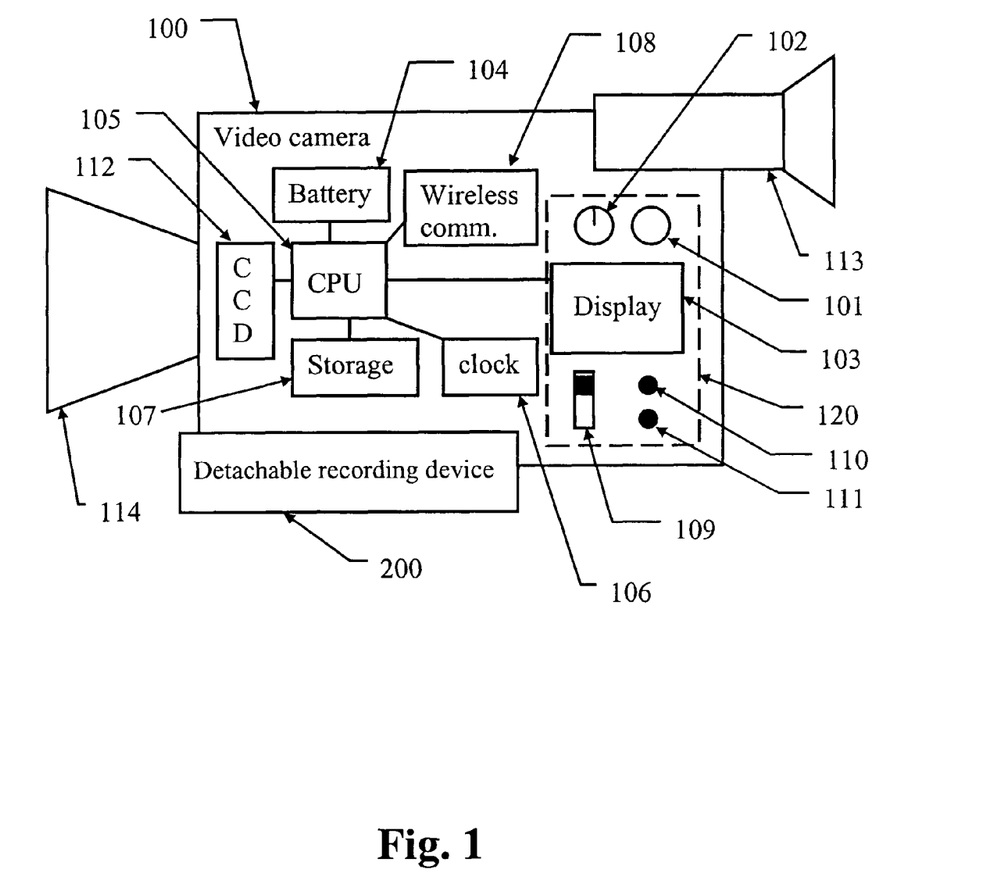
FIG. 1 shows a video camera device with additional features according to the present disclosure.

FIG. 1 shows a video camera device 100 capable of recording video and optionally audio data into a storage 107 thereof. The camera device 100 is preferably a digital video camera having a digital storage. Such affords the ability to non-linearly store metadata associated with recorded content. The camera device 100 has a lens 114 and a viewfinder 113 for viewing a scene to be recorded and a charge-coupled-device 112 for capturing a video representation of the scene. A central processing unit (CPU) 105 operates to control the camera device 100 and specifically to enable recording of video, audio and other information (data) in the storage 107. The camera device 100 also includes other interface features 120 such as, a record button 101, a display control jog dial 102 for editing control, a port 110 for wired connection to a remote audio recording device 200 or to another camera device 100, a port 111 for connecting to a pair of headphones facilitating private audio reproduction, a battery 104 that powers the video camera device 100, and a display 103 for reproducing the scene presently being viewed.

The camera device 100 further includes a precision clock 106 that is desirably kept running as long as possible, even after the power to other components of the camera device 100 has been shut down. If the precision clock 106 has to stop and restart, the camera device 100 is desirably configured via the CPU 105 to notify the storage 107 that the clock 106 has restarted, by incrementing a storage clock-reset counter 302, to be described with reference to FIG. 3. The camera device 100 as illustrated also includes the remote audio recording device 200 which is detachable and which may be operated via wired or wireless connections. A wireless communications unit 108 is provided for communicating between the CPU 105 and the remote recording device 200, and an associated-devices toggle switch 109 for selecting whether to associate single or multiple other camera devices 100, and/or remote audio recording devices.

Figure 2:
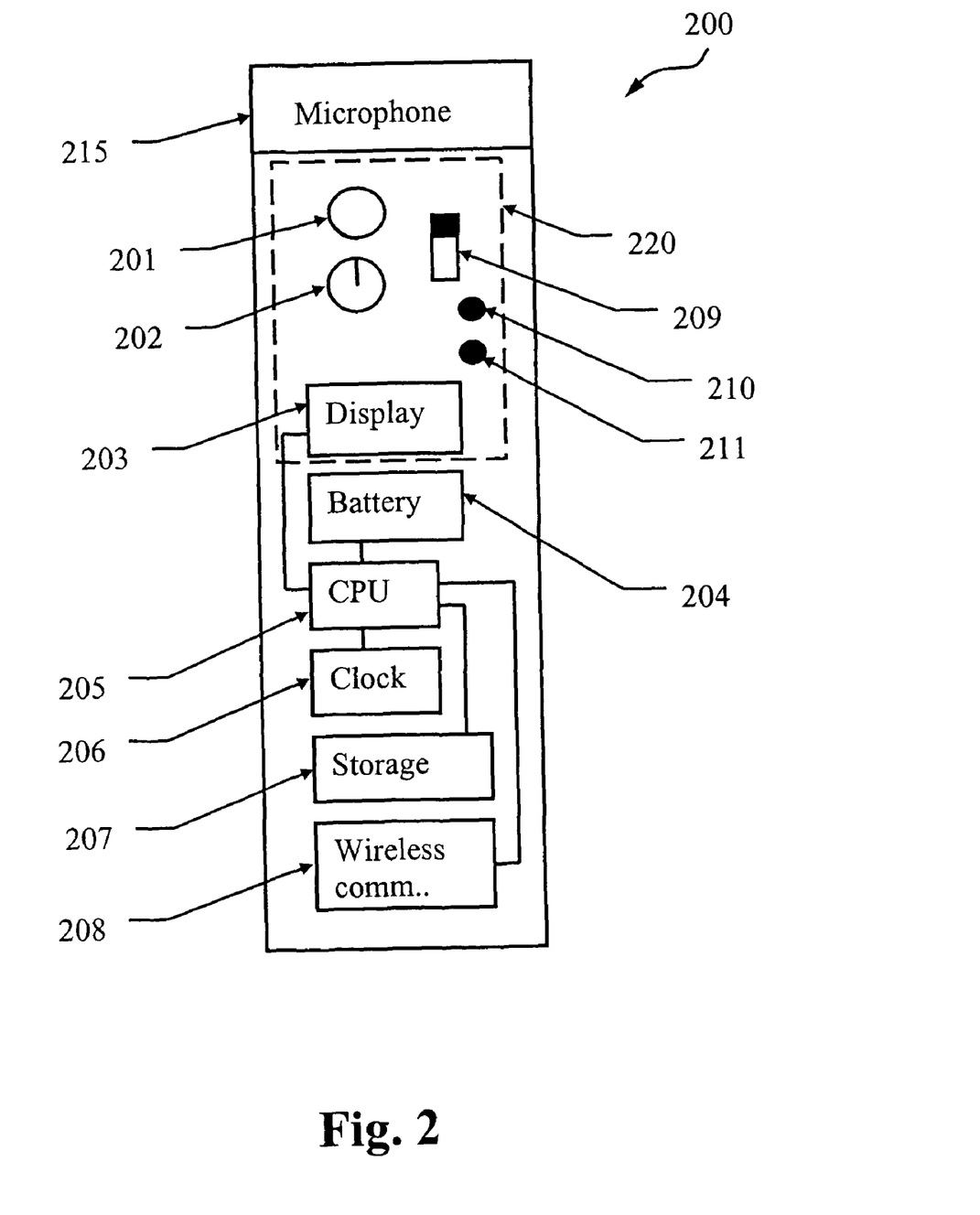
FIG. 2 shows a microphone remote-control device for used with the camera device of FIG. 1.

FIG. 2 shows the detachable wireless remote audio recording device 200 which is seen to include a monophonic or stereophonic microphone 215 configured to enable audio recording operations to be performed. A stereophonic microphone may be formed from a combination of two or more monophonic microphones. A central processing unit (CPU) 205 is provided to control operation of the remote recording-device 200 which, like the camera-device 100, also includes interface features 220 including a record button 201, a display control jog dial 202, an associated-devices toggle switch 209 for selecting whether to associate single or multiple other devices, a display 203, a port 210 for wired connection to a video camera device 100, and a port 211 for connecting to a pair of headphones. When the recording device 200 is attached to the camera device 100, a wired connection therebetween is preferably formed by a coupling between the ports 110 and 210. The remote recording device 200 further includes a precision clock 206, a storage 207 for audio data sourced from the microphone 215 and metadata, a wireless communications unit 208 for communicating to the camera device 100, and a battery 204 that powers the remote recording device 200. Like that in the camera device 100, the precision clock 206 is desirably kept running as long as possible, even after the power to other components of the remote recording device 200 has been shut down. If the clock 206 has to stop and restart, the remote recording device 200 is desirably configured via the CPU 205 to notify the storage 207 that the clock 206 has restarted, by incrementing the corresponding storage clock-reset counter 302.

The wireless communications units 108 and 208 may be configured to operate according to the IEEE 802.11B or IEEE 802.11G standards for radio frequency communication offering effective communications distances of about 20 metres and 100 metres respectively.

Figure 3:
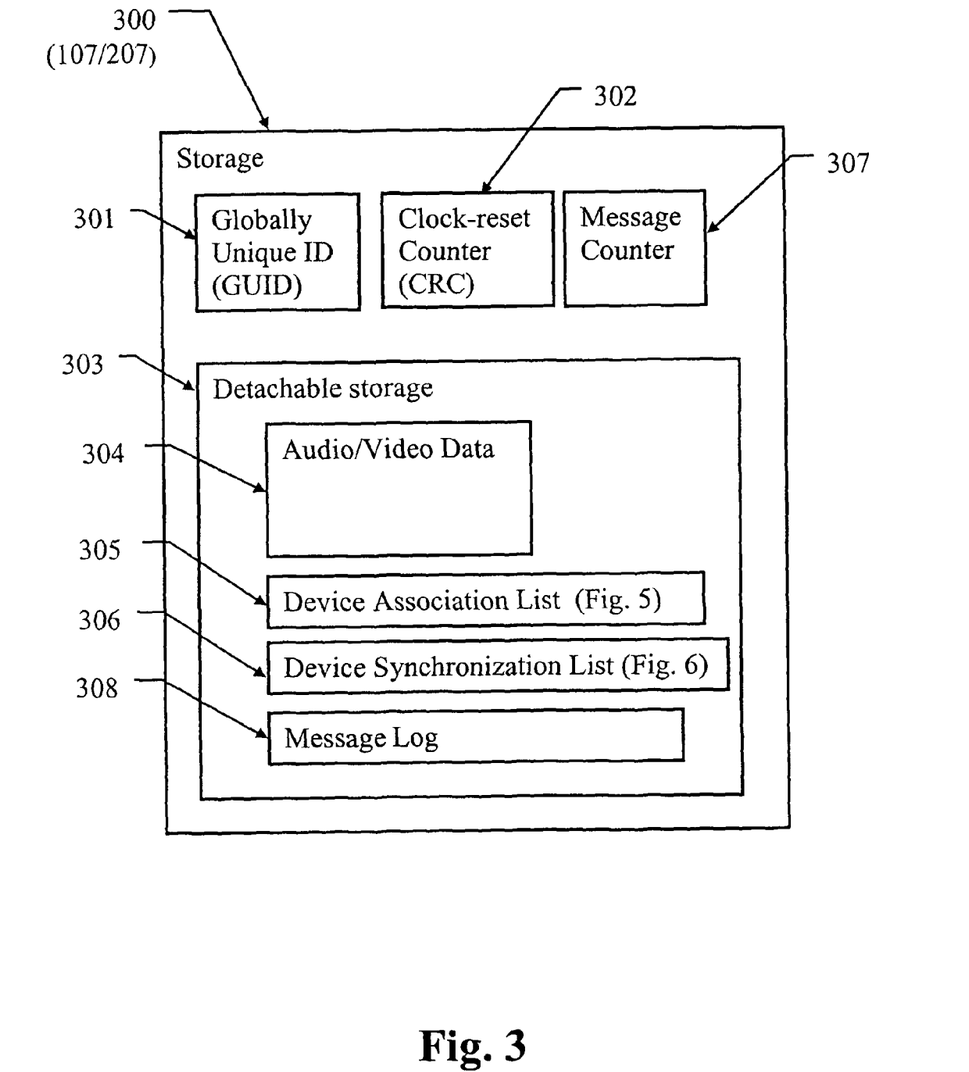
FIG. 3 shows components for data storage in each of the devices.

FIG. 3 shows the layout of data storage 300 as implemented in each of the storage 107 of the video camera device 100 and the storage 207 of the remote recording device 200. Each storage 107, 207 keeps the data intact even in the absence of power. Each device 100, 200 has an unchanging globally unique identity (GUID) string 301 permanently retained to identify the respective storage 107, 207. A Clock-reset Counter (CRC) 302 is provided to store an incrementing integer, also permanently retained to maintain track of those instances where the corresponding precision clock 106,206 has been restarted. Also provided is a message counter 307 adapted to maintain a unique count for each message produced by the storage 300. Each storage 107, 207 further includes a detachable storage component 303 that stores corresponding audio or visual data 304, a list of device associations 305, a list of device synchronization messages 306, and a message log 308. The message counter 307 initially stores the number 0, and is incremented every time a message is sent from the corresponding device 100, 200. The clock-reset counter 302 initially stores the number 0. Every time the internal clock 106 or 206 has to be restarted, the CRC 302 is incremented by one, and the message counter 307 reset to zero.

Figure 4:
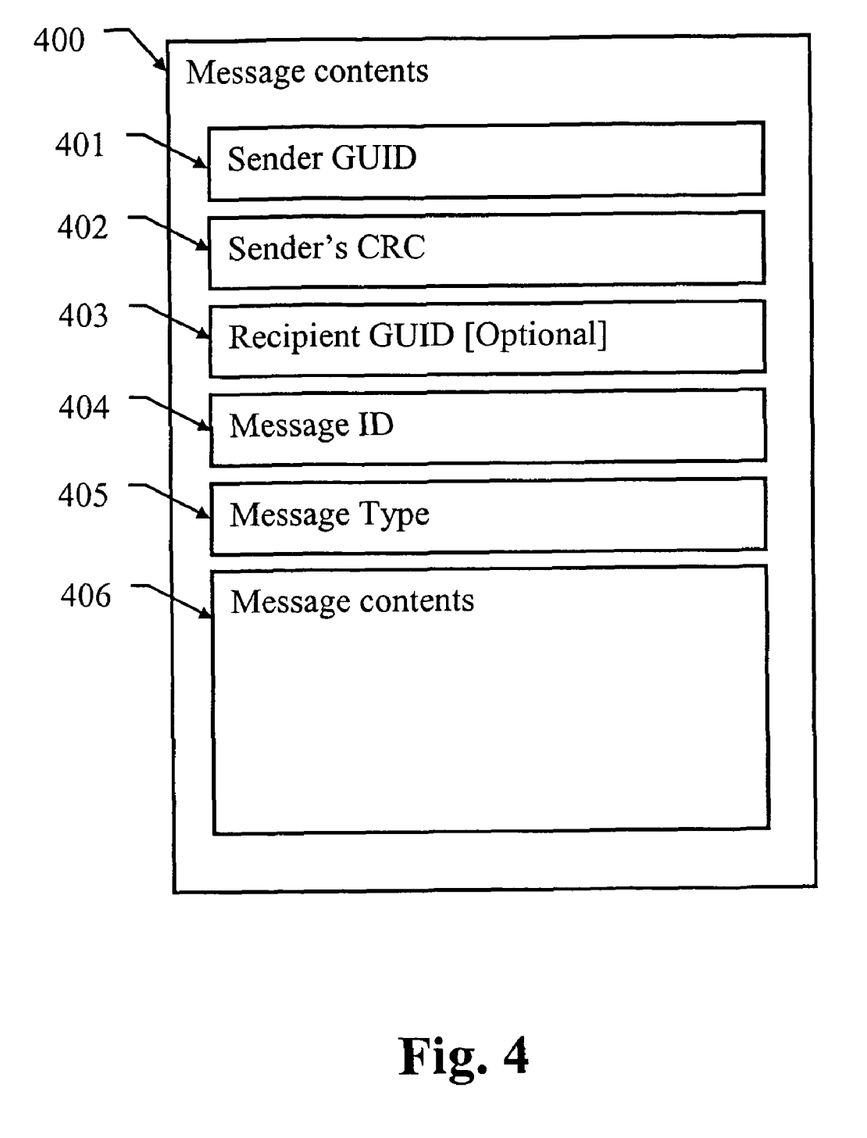
FIG. 4 shows a message format used for communicating between the camera device and the remote-control device.

FIG. 4 shows the format of a message 400 that might be sent from either device 100, 200, hereafter referred to as the "sender", either wirelessly using the wireless communications 108 or 208, or wired, using the connection port 110 or 210 of the corresponding device 100, 200. The message 400 comprises the sender's GUID 401 obtained from the sending device's GUID storage 301, the sender's CRC 402 obtained from the sending device's CRC storage 302, and optionally the recipient device's GUID 403, a message ID 404 obtained from the sending device's message counter 307, an indication of the message type 405, and the message contents 406.

Figure 5:
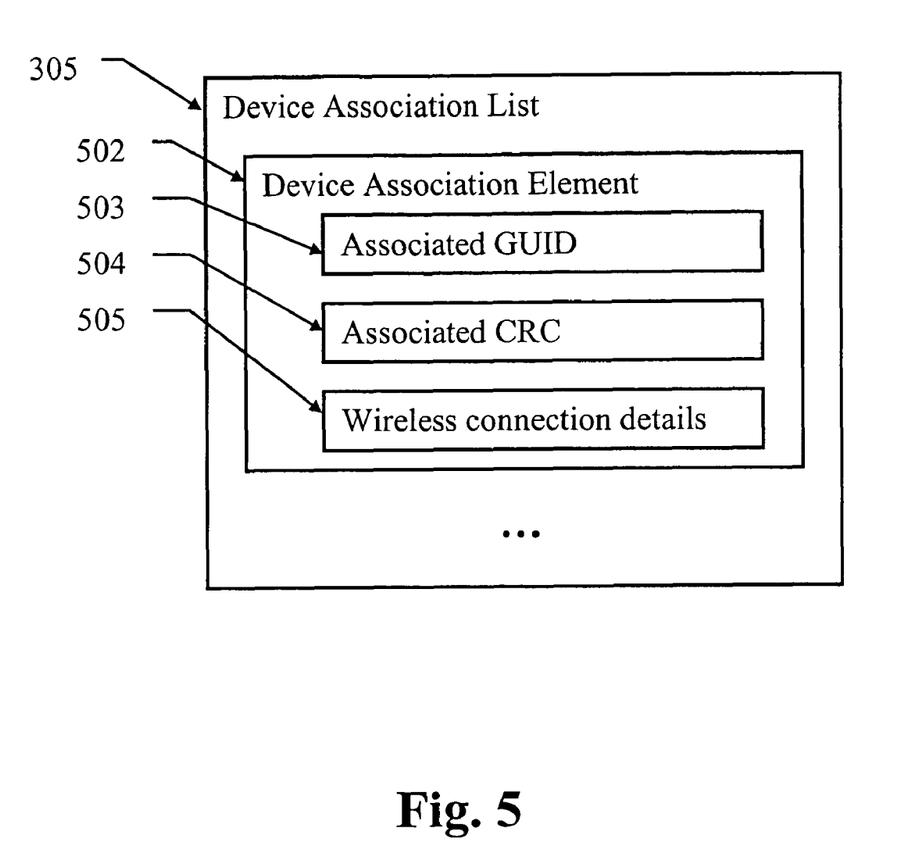
FIG. 5 shows a data structure of a device association list.

FIG. 5 shows the format of a device association list 305 as present in each storage 300. The device association list 305 includes zero or more device association elements 502, each of which comprise an associated GUID 503, being the GUID of the device 200, 100 being associated with, the associated CRC 504 being the CRC of the device 200, 100 being associated with, and wireless connection details 505, being whatever information is required to reconnect to the associated device 200, 100 via the wireless connection 108 or 208.

Figure 6:
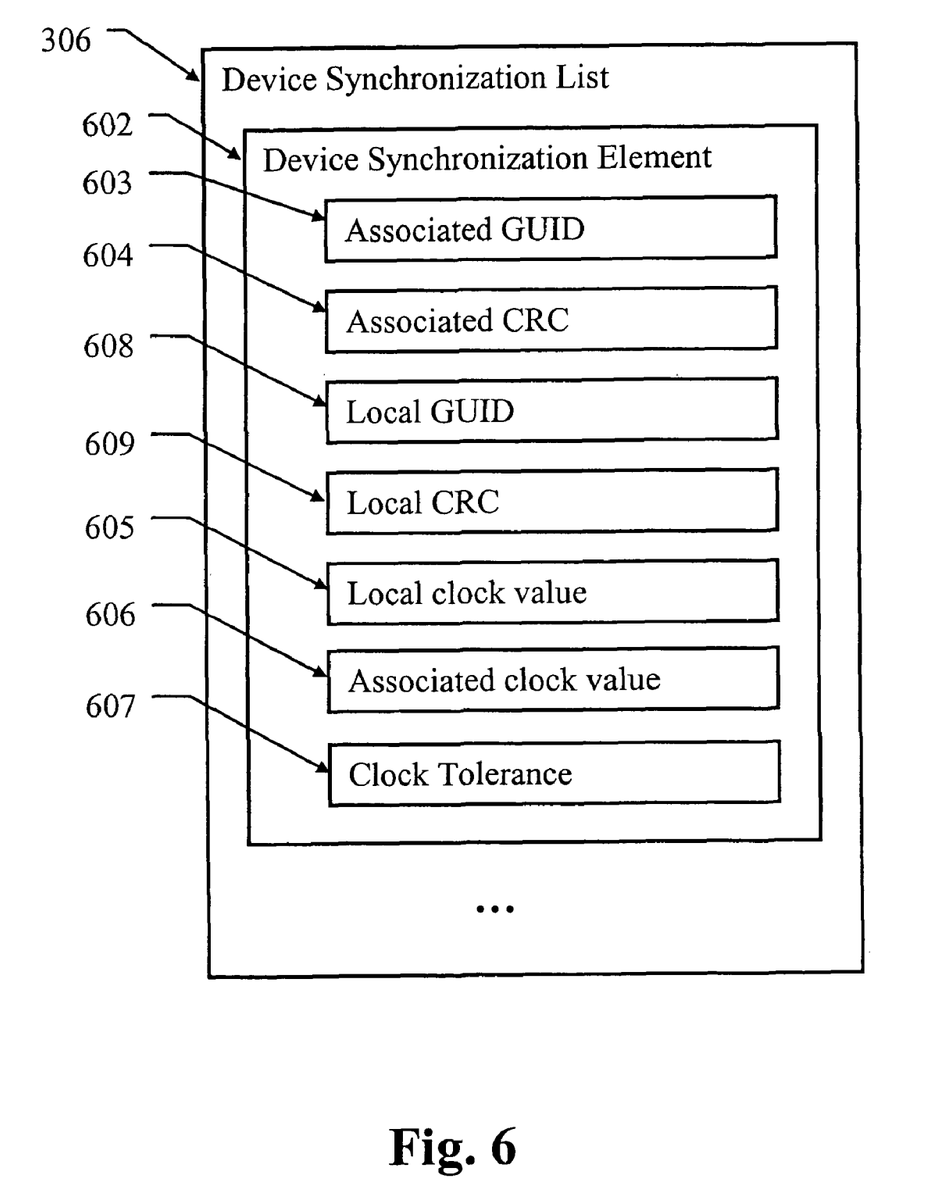
FIG. 6 shows a data structure of a device synchronization list.

FIG. 6 shows the format of a device synchronization list 306 as present in each storage 106, 206. The device synchronization list 306 comprises zero or more device synchronization elements 602, each of which include an associated GUID 603, being the GUID 301 of the device 200, 100 being associated with, the associated CRC 604 being the CRC 302 of the device 200, 100 being associated with, a Local GUID 608, being the GUID of the local device 100, 200, a local CRC 604 being the CRC 302 of the local device 100, 200, a local clock value 605, being a value of the internal clock 106, 206 of the local device 100, 200, an associated clock value 606, being a value of the internal clock 206, 106 of the associated device 200, 100, and a clock tolerance 607, being a measure of the accuracy of the synchronization between the local clock value 605 and the associated clock value 606.

Figure 7:
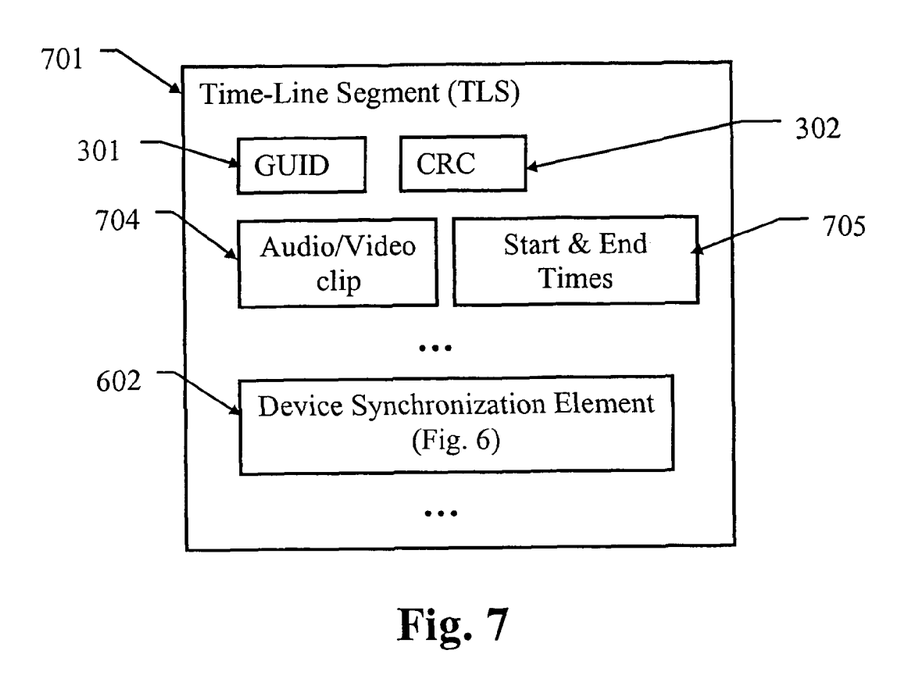
FIG. 7 depicts a data structure of a Time-Line Segment used for synchronization between the devices.
Figure 8:
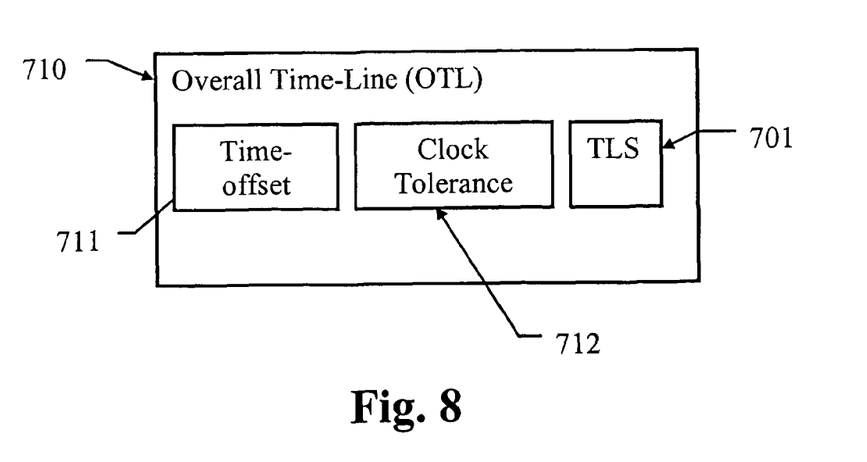
FIG. 8 depicts a data structure of an Overall Time-Line.

FIG. 7 shows structures used to determine synchronization between devices, such as the camera device 100 and the remote recording device 200. Synchronisation is required when a recording operation, undertaken with either one or both of the devices 100, 200 produces what is termed in the art a "clip", defined as data continuously recorded between a start time and an end time. A clip may be for any duration however, in amateur video productions, clips may typically have a duration of between about 10 seconds and 2 minutes. Some clips can be very short, occupying only a small number of video frames, or quite long, for example if an entire event (eg. a concert or football match) is recorded. As seen in FIG. 7, a Time-Line Segment (TLS) 701 includes a GUID 301 and a CRC 302. Further all Audio\Video Clips 704, as the case may be, that have those included GUID and CRC are listed in the Time-Line Segment 701, alongside the Start and End Times 705 of each clip 704. In addition, all Device Synchronization Elements 706 that relate to the GUID 301 and CRC 302 are listed in the Time-Line Segment 701. In FIG. 8, an Overall Time-Line (OTL) 710 is seen to have a structure formed of any number of Time-Line Segments (TLSs) 701, along with a Time-offset 711 and a Clock Tolerance value 712, whose determinations are discussed later in this document.

In a preferred implementation, a user has two devices, which may be both video camera devices 100, both audio remote recording devices 200, or one each of the video camera device 100 and the remote recording device 200 device.

Each device 100, 200 is capable of sending messages 400, either directed towards other devices or omnidirectionally broadcast, using the corresponding wireless communications 108 or 208. Whenever a device 100, 200 sends a message 400 (the circumstances in which messages are sent being stated below), the device 100, 200 puts the message into the Message format 400 as indicated in FIG. 4. The device 100, 200 includes in the content at least its GUID 301 in the Sender GUID 401, the value of its Clock-Reset Counter 302 in the Sender's Clock-Reset Counter 402, the value of the Message Counter 307 in the Message ID 404, and an indication of the type of the message in the Message Type 405. The device 100, 200 then increments the Message counter 307.

The user may further connect the two devices using the ports (110 and/or 210) for connection either directly or via a connecting cable (not illustrated but functionally known in the art). The connection between the two devices serves as a trigger for the following, labelled A-E:

A. Each (specific) device 100, 200 stores a Device Synchronization Element 602 in its Device Synchronization List 306 in its storage 300 (107 or 207), including the following data:

AA. The Local Clock value 605, being the time at which the devices were connected, according to the internal clock (106 or 206) of the specific device. The time may be expressed as a real-time (ie. year, month, date, hour, second, etc) and desirably has a resolution of milliseconds thereby enabling sufficient scope for resolving time differences between recorded image frames over a range of popular recording formats which may have frame rates of 24-30 frames per second (ie. 42-33 ms) or interlace rates of 100 Hz (ie. 10 ms). The internal clock may merely be a counter having, say, 36 bit accuracy to give at least 2 years of usable time. However since the described arrangements operate according to time differences, shorter periods of time may be suitable for some productions. In some implementations, resources may be better expended upon minimizing drift in the clocks 106 and 206 rather than extending their respective absolute times of operation.

AB. The Associated GUID 603 being the GUID 301 of the device to which the specific device is connected, and the Associated CRC value 302 of the device to which the specific device is connected.

AC. The Local GUID 608 being the GUID 301 of the specific device, and the Local CRC value 609 being the CRC 302 of the specific device.

AD. The Associated Clock value 606, being the time at which the devices were connected, according to the internal clock (106 or 206) of the device to which the specific device is connected.

AE. A Clock Tolerance value 607, indicating the level of accuracy of the synchronization between the Local clock value 605 and the Associated Clock value 606.

B. If either device 100, 200 has its associated-devices toggle switch 109 or 209 set to "single device", that device deletes all the Device Association Elements 502 from the Device Association List 305 in its storage 300 (107 or 207).

C. Each specific device 100, 200 creates a Device Association Element 502 comprising the Associated GUID 503 taken from the GUID 301 of the connected device, and the Associated CRC 504 taken from the Clock-reset counter 302 of the connected device, along with any other information the specific device needs to wirelessly communicate with the connected device at some later stage 505. The specific device puts this Device Association Element 502 into its Device Association List 305, in its storage (107 or 207).

D. If one device is an audio device 200 and the other device is a video device 100, and the audio device 200 has audio data in its storage 304 or in its device synchronization list 306, and if the video device 100 has sufficient space in its storage, the audio device 200 may transfer all its audio/video data into the video device 100, either automatically, or by indicating to the user on either or both displays 103 and 203 that there is data that may be transferred, and requesting the devices 100 and 200 choose whether to do so using the display control jog dial 102 or 202. The transfer of the data between the devices 100 and 200 is done in such a way that detaching the two devices 100 and 200 at any point in the procedure does not cause any data to be lost.

E. If the two devices 100, 200 have audio/video data 304 that overlap in time, each specific device may make copies of the data that overlaps from the other connected device, depending on the space available in the storage of that specific device 300. This may either be done automatically, or by indicating to the user on either or both displays 103 and 203 that there is data that may be exchanged and requesting the user to choose whether to do so using the display control jog dial 102 or 202. Similarly, the devices 100, 200 may choose to copy each others' Device Synchronization List 306, either manually or automatically, and may base this decision on whether elements of the other connected device's Device Synchronization List 306 refer to devices that are in its Device Association List 305 or are referred to in the connected device's AudioNideo Data 304.

The connection between the ports 110 and 210 may also be used to supply electrical energy from the battery 104 of the camera device 100 to the battery 204 of the remote recording device 200 to effect a recharging operation.

The user may then separate the two devices 100, 200 by unplugging the connector between them from the connection ports (110 and/or 210).

The user may subsequently connect other devices 100, 200 to these devices 100, 200. The same process is carried out whenever two such devices are connected.

In respect of general operation of the devices 100, 200 a number of events, in no particular order, may occur at any time:

(i) If the user presses the record button (101 or 201) on a specific device that is not currently recording, the specific device 100, 200 starts recording video or audio data respectively into its storage 304, and also records the GUID 301 and CRC 302 and the start time of the data as read from the internal clock 106 or 206 with the audio and/or video data. The specific device indicates that it has started recording on the display 103 or 203, and sends a message 400 with a message type 405 "Start Recording", to each recipient one of the devices 100, 200 in its associated devices list 305 and stores a copy of each message that it sends in the Message Log 308. The specific device 100, 200 may also indicate on its display 103 or 203 for each associated device that the associated device has not started recording yet. While the devices are recording, a user may listen to the sound level of the audio being recorded on that device via the headphone port 111 or 211. Where a camera device 100 has an integrated microphone (not illustrated but well known in the art), the camera device 100 can be enable top record both audio and video data to the storage 107 according to the protocols described herein. Similarly, and where appropriate it may be possible to transfer recorded video data to the storage 207 in the remote recording device 200.

(ii) If a specific device 100, 200 receives a message with Message Type 405 "Start Recording", the specific device 100, 200 checks that the associated device 100, 200 that sent the message is in the Device Association List 305. This is done by the specific device 100, 200 examining the Sender GUID 401 received with the message and checking each Associated GUID 503 of the various Device Association Elements 502 retained in the Device Association List 305 of the specific device 100, 200. If the Sender GUID is found, the specific device 100, 200 acknowledges this by starting recording, consistent with the received Message Type 405. The specific device 100, 200 further indicates on its display 103, 203 that recording has been started in response to the request of an associated device. Additionally, the specific device 100, 200 sends a reply message with Message Type 405 "Acknowledge Start Recording" to the associated device. The reply message includes information on whether the specific device 100, 200 started recording or not, and a reference to the message ID 404 of the original message in the message contents 406 of the reply message.

(iii) If a specific device 100, 200 receives a message with Message Type 405 "Acknowledgement Start Recording" that corresponds to a "Start Recording" message in the Message Log 308 of the specific device 100, 200, the display 103, is altered to show that the associated device is recording.

(iv) If the user presses the record button (101, 201) on a specific device 100, 200 that is currently recording, the specific device 100, 200 stops recording audio and/or video data into the corresponding storage 304, and also records the stop time of the data as read from the internal clock 106, 206 with the audio and/or video data. The specific device 100, 200 indicates on the display 103, 203 that recording has been stopped, and sends a message 400 with a message type 405 "Stop Recording", to each associated device 100, 200 in the associated devices list 305 of the specific device 100, 200 whilst storing a copy of each message that the specific device 100, 200 sends in the corresponding Message Log 308.

(v) If a specific device 100, 200 receives a message with Message Type 405 "Stop Recording", the specific device 100, 200 checks that the other device 100, 200 that sent the message is identified in the Device Association List 305. This is done by examining the Message Sender GUID 401 in each of the Associated GUIDs 503 retained in each Device Association Element 502 of the specific device 100, 200. If the appropriate Message Sender GUID 401 is located, and the specific device 100, 200 is currently recording, the specific device 100, 200 stops recording, and indicates on the corresponding display 103, 203 that recording has been stopped in response to a request received from an associated device 100, 200. Additionally, the specific device 100, 200 sends a reply message with Message Type 405 "Acknowledge Stop Recording" to the associated other device 100, 200 that sent the original message. The reply message includes information on whether the specific device 100, 200 stopped recording or not, and a reference to the message ID 404 of the original message in the message contents 406 of the reply message.

(vi) If a specific device 100, 200 receives a message with Message Type 405 "Acknowledgement Stop Recording" that corresponds to a "Stop Recording" message in the Message Log 308 of the specific device 100, 200, the corresponding display 103, 203 is changed to show that the associated device 100, 200 is no longer recording.

(vii) If a specific device 100, 200 is running low on battery power, such may be indicated on the corresponding display 103, 203. The specific device 100, 200 may additionally send a message with Message Type 405 "Low Battery" to all the other devices 100, 200 identified in the corresponding device association list 305. The message may optionally contain in its Message contents 406 an indication of the battery time remaining by virtue of the stored energy capacity thereof.

(viii) If a specific device 100, 200 receives a message with Message Type 405 "Low Battery", it may indicate on the corresponding display 103, 203 that the associated device has low battery.

(ix) If a specific device 100, 200 is running low on memory, particularly as used for the data 304, such may also be indicated on the corresponding display 103, 203. The specific device 100, 200 may additionally send a message with Message Type 405 "Low Memory" to all the other devices in the corresponding device association list 305, optionally containing in the Message contents 406 thereof an indication of the memory remaining.

(x) If a specific device 100, 200 receives a message with Message Type 405 "Low Memory", an indication that an associated device 100, 200 has low memory may be made on the display 10, 203 of the specific device 100, 200.

(xi) A specific remote recording device 200 may periodically send a message with Message Type 405 "Recording Levels" to each of the associated devices 100, 200 identified in the device association list 305 of the specific remote recording device 200. These audio recording levels are contained in the message contents 406 of the sent message.

(xii) If a specific device 100, 200 receives a message with message type 405 "Recording Levels", the specific device 100, 200 may indicate recording levels of the associated device on the display 103, 203 of the specific device 100, 200.

(xiii) The user may further alter the recording levels of a device 100, 200 that has audio recording levels represented on the display 103, 203 of a specific device 100, 200 using the display control jog dial 102, 202 of the specific device. The deice 100, 200 having audio recording levels adjusted may therefore by the specific device 100, 200 or an associated device 100, 200. When the recording levels of an associated device are requested to be changed by the user, the specific device 100, 200 sends to the associated device 100, 200 a message with message type 405 "Change Recording Levels", with the message contents 406 thereof being an indication of the desired level to which the recording level is to be changed. If the specific device 100, 200 does not receive a message with Message Type 405 "Acknowledgement Change Recording Levels" in a timely fashion, being an acknowledgment by the associated device 100, 200, an error may be indicated on the display 103, 203 of the specific device 100, 200.

(xiv) If a specific device 100, 200 receives a message with Message Type 405 "Change Recording Levels", the Device Association List 305 of the specific device 100, 200 is checked to determine that the other device 100, 200 making the request is identified by looking for the Sender GUID 401 conveyed with the message in each of the Associated GUIDs 503 of the Device Association Element 502. If the other device is indeed associated, the specific device 100, 200 then changes the recording levels as requested, show such on the corresponding display 103, 203, send a reply message with Message Type 405 "Acknowledgement Change Recording Levels" to the other associated device 100, 200, and include in the message content 406 of the reply message that the specific device 100, 200 has changed the microphone recording levels in response to the request from the other associated device 100, 200.

(xv) A specific device 100, 200 may periodically broadcast a message 400 with a Message Type 405 "Synchronization Message", containing the current internal clock value 106, 206 in the message contents 406.

(xvi) If a specific device 100,200 receives a message 400 with Message Type 405 "Synchronization Message", the message is stored in the Message Log 308 and the specific device 100, 200 sends a reply message with Message Type 405 "Acknowledgement for Synchronization Message" and containing the current internal clock value 106, 206 of the specific device 100, 200 in the Message Contents 406, to the original device 100, 200 that broadcast the received message. The acknowledgement reply message contains the time at which the specific device 100, 200 received the original message containing the internal clock value 106, 206, in the message contents 406 thereof. The acknowledgement message may additionally contain a request for a further acknowledgement message in response.

(xvii) If a specific device 100, 200 receives a message 400 with Message Type 405 "Acknowledgement for Synchronization Message", and there is a record of a corresponding synchronization message in the Message Log 308, the specific device 100, 200 creates a Device Synchronization Element 602 having an Associated GUID 603 and Associated CRC 604 taken respectively from the sender GUID 401 and sender CRC 402 from the message 400, and the Local GUID 608 and Local CRC 609 taken from the specific device 100, 200. The Device Synchronization Element 602 also has formed a Local Clock value 605 equal to an average of the time at which the original synchronization message was sent from the specific device 100, 200 and the time at which the acknowledgement was received by the specific device 100, 200. An Associated Clock value 606 is set equal to the clock value in the Message Contents 406, and the Clock Tolerance 607 is determined to be equal to half the difference between the time at which the original synchronization message was sent and the time at which the acknowledgement was received, both by the specific device 100, 200. The specific device 100, 200 then adds the newly created Device Synchronization Element 602 to the Device synchronization list 306. The specific device 100, 200 may also send a further message 400 of Message Type 405 "Acknowledgement for Synchronization Message", containing the current internal clock value 106, 206 in the Message Contents 406. In this way, a series of synchronization messages may be sent back and forth until both devices are satisfied that they have a sufficiently accurate estimate of the difference between the clock values of the two devices.

(xviii) A remote recording device 200 may attempt to transfer sections of data retained in the storage 207 to another device 100, 200 using the wireless communications module 208. Such transfer may take the form of a message 400 with a Message Type 405 "Data transferral", and a Message Contents 406 including a section of the Audio/Video Data 304 or of the Device Synchronization List 306 both taken from the storage 207 of the remote recording device 200. The recipient device 100, 200 of the transfer message will be the first member that was added to the Device Association List 305. In addition, the recipient device 100, 200 stores a copy of the message minus the Message Contents 406 in the Message Log 308 thereof, the transferred Message Contents being stored in the corresponding audio/video data storage 304 and Device Synchronization List 306, as the case may be.

(xix) If a specific device 100, 200 receives a message 400 with a Message Type 405 "Data transferral", the specific device 100, 200 first checks if there is enough space in the corresponding storage 300 to add the content. If there is sufficient capacity, the content is then added to the corresponding Audio/Video Data 304 or Device Synchronization List 306 as appropriate. The specific device 100, 200 then sends a reply message with Message Type 405 "Acknowledgement for Data transferral", stating in the Message contents 406 thereof whether or not the data transferral was successful.

(xx) If a specific device 100, 200 receives a message 400 with a Message Type 405 "Acknowledgement for Data transferral", the specific device 100, 200 confirms that it had sent the data transferral message in question by checking for a record thereof in the Message Log 308. If such a message exists and the Message Contents 406 indicate that the transferral was successful, the specific device 100, 200 then deletes the section of data that had been successfully transferred.

(xxi) A user may detach the detachable storage 303 from a first device 100, 200 and attach the storage 303 to another device 200, 100. If a device 100, 200 has no detachable storage 303 currently attached, such information is displayed via the display 103, 203. Such a device 100, 206 does not allow recording, and does not send or receive messages until such time as a detachable storage 303 is re-attached.

(xxii) If a device 100, 200 had detachable storage 303 attached, and the detachable storage 303 has memory space available, the device 100, 200 can resume recording and sending/receiving messages. Such is useful for re-attachment of the detachable storage 303.

At some point, the user may wish to play back data that they have recorded, either on a video camera device 100 or a dedicated playback device of some description, such as a digital video player. To do so, the user is presented with the audio and video clips that are stored in the storage 304 of the device 100. Those clips may have been obtained from a number of possible devices 100, 200, each having different clocks 106, 206. In order to find the relationships between the clips, it is necessary to use the Device Synchronization List 306. The following rules may be used to determine the order of the clips in time:

(a) A Time-Line Segment (TLS) 701 is created to group all Audio/video clips 704 that have the same GUID 301 and CRC 302. Each Audio/video clip 704 has corresponding Start and End Times 705 of that clip.

(b) If, when examining the Device Synchronization List 306, in a Device Synchronization Element 602, there is a first TLS 701 having a GUID 301 corresponding to the Associated GUID 603, a CRC 302 corresponding to the Associated CRC 604 and a second TLS 701 having a GUID 301 corresponding to the Local GUID 608 and CRC 302 corresponding to the Local CRC 609, the device 100 adds that Device Synchronization Element 602 to each of the first and second TLSs 706.

(c) One or more Overall Time-Lines (OTL) 710 are constructed from the individual TLSs 701. The function of an OTL 710 is to show TLSs 701 in time-sequence and is formed using a list of TLSs 701. Each TLS 701 has a Time-Offset 711 and a Clock Tolerance 712. The OTL 710 is constructed in the following manner:

(ca) Select an initial TLS 701. The user may perform this selection by manipulating the user inputs 120. Otherwise the TLS 710 corresponding to the current Device GUID 301 and the most recent CRC 302 is chosen, otherwise the TLS 701 that contains the most data is chosen. The chosen TLS 701 has a time-offset 711 of 0 and a Clock Tolerance 712 of 0.

(cb) With the initial TLS 701, the Device Synchronization Elements 602 thereof are reviewed from the highest to lowest time-stamps, being the local clock value 605. If the Associated GUID 603 and Associated CRC 604 are the values of the initial TLS 701, then add the TLS 701 referred to by the Local GUID 608 and Local CRC 609 of the Device Synchronization Element 602 to the OTL 710, if such has not already been added. The associated time-offset 711 of the OTL 710 is then determined to be equal to (Associated Clock Value 606−Local Clock Value 605+Initial TLS time-offset 711). If instead, the Local GUID 608 and Local CRC 609 are the values of the initial TLS 701, then add the TLS 701 referred to by the Associated GUID 603 and Associated CRC 604 to the OTL 710, if such has not already been added. The associated time-offset 711 in this case is then determined to be equal to (Local Clock Value 605−Associated Clock Value 606+Initial TLS time-offset 711). In either case, the Clock Tolerance 712 of the OTL 710 is determined to be equal to (Clock Tolerance 607+Initial TLS Clock Tolerance 712).

(cc) For each newly included TLS 701 in the OTL 710, step (cb) is repeated, treating each newly included TLS 701 in turn as the initial TLS 701. This step is repeated until no new TLSs 701 are added to the OTL 710.

(d) The user may then view the entire OTL 710 or play segments of the OTL 710. If the user requests to play from a particular time-stamp local clock value 605 of an OTL 710, it is necessary to then determine which audio and/or video clip data 704 are active at that time-stamp, and at what point the data 704 should be played, by going through each TLS in turn and checking whether it has data at that time-stamp 705, taking into account the time-offset 711 attached to the TLS 710. The appropriate video and audio segments may be simultaneously reproduced, or the user may choose which video and/or audio segments to reproduce.

In some cases, there will be more than one Device Synchronization Element 602 shared between TLSs 701. Such may occur more than one DSE links to the same two TLSs. This may occur for example if a remote audio device 200 were connected to a camera device 100 twice, which would produce two DSE between those two devices, assuming the CRC is the same. Where more than one DSE is shared, information about relative clock-speeds from the time-stamps may be derived and used to compress or expand audio and/or visual data to better synchronize the two with other data. It is also possible to choose which Device Synchronization Elements 602 of the TLS 701 to use depending on the Clock Tolerance 607 of the DSE 602, and to make corrections to the Time-offset 711 of each TLS 701 accordingly.

The arrangements described are preferably implemented using digital recording devices for each of the storages 107, 207. Typically the camera device will be a digital video camera and the storage 107 may be implemented using a hard disk drive or non-volatile semiconductor memory. However, because of size constraints, convenience and the smaller volume of data, the storage 207, which operates for audio recording, is typically formed of non-volatile semiconductor memory. In alternative implementations, either one or both of the storages 107, 207 may be performed using a writable optical disk. Any one or more of a number of image and audio compression schemes may be implemented within the system to achieve compression of captured information prior to storage thereof, thereby optimizing storage capacity. Suitable compression formats include MPEG for combined audio and video, MPEG for video only, and MP3 or Ogg Vorbis for audio only.

INDUSTRIAL APPLICABILITY

The arrangements described are applicable to the video recording and production industries.

The foregoing describes only some embodiments of the present invention, and modifications and/or changes can be made thereto without departing from the scope and spirit of the invention, the embodiments being illustrative and not restrictive.

The claims defining the invention are as follows:

1. A system for recording audio and video, said system comprising:

at least one video camera device, each said video camera device comprising (a) a subsystem for capturing at least video data, (b) a storage device upon which at least the video data is stored, (c) a wireless interface for communicating with at least one further recording device, (d) an internal clock for recording at least a time at which the video data was recorded, and (e) a connecting port enabling connection to a remote-control device;

at least one said further recording device, each said further recording device comprising (a) at least one microphone for capturing audio information, (b) a storage device upon which corresponding audio data is recorded, (c) a wireless interface for communicating with said video camera device, (d) an internal clock for recording at least a time at which the audio data was recorded, and (e) a connection port enabling connection to said video camera device, wherein said at least one further recording device is configured to operate both when connected to and when separate from said at least one video camera device, and wherein said storage device of said video camera device is separate from said storage device of said further recording device; and at least one device synchronization list configured to store (a) a time from said internal clock of said video camera device, (b) a time from said internal clock of said at least one further recording device, and (c) a clock tolerance indicating a level of accuracy of time synchronization between said video camera device and said further recording device, the device synchronization list being used for simultaneous reproduction of the stored video data and the corresponding audio data recorded when said video camera device and said further recording device are separated.

2. A system according to claim 1, wherein one said further recording device is adapted to be physically and detachably coupled to one said video camera device for at least audio recording operations at the video camera device and, when detached, for audio recording operations at a location remote from said video camera device.

3. A system according to claim 1, wherein said further recording device further comprises a remote control device for controlling operation of said video camera device.

4. A system for recording audio and video data, said system comprising:

a video camera device comprising (a) a subsystem for capturing at least video data, (b) a storage device upon which at least the video data is stored, (c) a wireless interface for communicating with at least one remote controller, and (d) an internal clock for recording at least a time at which the video data was recorded;

at least one said remote controller, each said remote controller comprising (a) at least one microphone for capturing audio data, (b) a storage device upon which the audio data is stored, (c) a wireless interface for communicating with said video camera device, and (d) an internal clock for recording at least a time at which the audio data was recorded, wherein said at least one remote controller is configured to operate both when connected to and when separate from said video camera device, wherein said remote controller transmits reproduced audio data to said video camera device, and makes said video camera device record the reproduced audio data relating to the video data in accordance with each said internal clock of said remote controller and said video camera device, and wherein said storage device of said video camera device is separate from said storage device of said remote controller; and at least one device synchronization list configured to store (a) a time from said internal clock of said video camera device, (b) a time from said internal clock of said at least one remote controller, and (c) a clock tolerance indicating a level of accuracy of time synchronization between said video camera device and said remote controller, the device synchronization list being used for simultaneous reproduction of the stored video data and the corresponding audio data recorded when said video camera device and said remote controller are separated.

5. A system for recording audio and video data, said system comprising:

a video camera device comprising (a) a subsystem for capturing at least video data, (b) a storage device upon which at least the video data is stored, (c) a wireless interface for communicating with at least one remote controller, and (d) an internal clock for recording at least a time at which the video data was recorded;

at least one said remote controller, each said remote controller comprising (a) at least one microphone for capturing audio data, (b) a storage device upon which the audio data is stored, (c) a wireless interface for communicating with said video camera device, and (d) an internal clock for recording at least a time at which the audio data was recorded, wherein said at least one remote controller is configured to operate both when connected to and when separate from said video camera device, wherein said remote controller transmits reproduced audio data to said video camera device, and makes said video camera device record the reproduced audio data relating to the video data in accordance with each said internal clock of said remote controller and said video camera device, and wherein said storage device of said video camera device is separate from said storage device of said remote controller; and at least one device synchronization list formed within at least said storage device of said video camera device, said device synchronization list being configured to store (a) a time from said internal clock of said video camera device, (b) a time from said internal clock of said at least one remote controller, and (c) a clock tolerance indicating a level of accuracy of time synchronization between said video camera device and said remote controller, the device synchronization list being used for simultaneous reproduction of the stored video data and the corresponding audio data recorded when said video camera device and said remote controller are separated.

6. A system according to claim 5, further comprising at least one said device synchronization list formed within the storage device of the at least one remote controller.

\* \* \* \* \*